United States Patent [19]

Peters et al.

[11] Patent Number: 5,157,763
[45] Date of Patent: Oct. 20, 1992

[54] VISUALLY ASSISTED METHOD FOR TRANSFER OF DATA WITHIN AN APPLICATION OR FROM A SOURCE APPLICATION TO A RECEIVING APPLICATION

[75] Inventors: Anthony M. Peters, Bedford; Robert J. Torres, Colleyville, both of Tex.

[73] Assignee: International Business Machines Corporation, Armonk, N.Y.

[21] Appl. No.: 741,207

[22] Filed: Jul. 30, 1991

Related U.S. Application Data

[63] Continuation of Ser. No. 108,619, Oct. 15, 1987, abandoned.

[51] Int. Cl.⁵ .............. G06F 3/14; G06F 3/153; G06F 15/00
[52] U.S. Cl. .............. 395/157; 364/237.3; 364/260; 364/286.1; 364/419; 364/DIG. 1; 395/161; 340/721
[58] Field of Search ... 364/200 MS File, 900 MS File, 364/518, 521, 419; 340/709, 724, 721; 395/100, 157, 161

[56] References Cited

U.S. PATENT DOCUMENTS

| | | | |
|---|---|---|---|
| 4,428,065 | 1/1984 | Duvall et al. | 364/900 |
| 4,506,343 | 3/1985 | Shipp, Jr. et al. | 364/900 |
| 4,555,775 | 11/1985 | Pike | 364/900 |
| 4,648,062 | 3/1987 | Johnson et al. | 364/900 |
| 4,653,020 | 3/1987 | Cheselka et al. | 364/900 |
| 4,656,603 | 4/1987 | Dunn | 364/900 |
| 4,736,309 | 4/1988 | Johnson et al. | 364/521 |

FOREIGN PATENT DOCUMENTS 0156116  2/1985  European Pat. Off. ......... 340/721

OTHER PUBLICATIONS

Atari 52ST Computer, Owner's Manual, 1985 Atari Corp. pp. 21-25 and 53-55.
Nelson, K. et al., "Using Lotus Manuscript" of the Professional's Guide to Soph. Doc. Process. on the IBM ®PC, Osborne McGraw-Hill, Berkeley, Ca. 1987, pp. 61-81.

Primary Examiner—Thomas C. Lee
Assistant Examiner—Ayni Mohamed
Attorney, Agent, or Firm—Whitham & Marhoefer

[57] ABSTRACT

Data is transferred between files within an application program or between multiple, independent, simultaneously active application programs appearing concurrently on a computer display screen using a visually assisted method. Data to be transferred from a first location is marked on the computer display screen. Subsequent optional selection of either a Cut or a Copy function causes a distinctive border to appear around the marked data. An input device may then be used to move the bordered area to a new location on the computer display screen without alteration or movement of the originally marked data. A data transfer symbol appears within the bordered area during the data transfer operation to signify that such an operation is in progress. Further selection of a Paste function causes the marked data to be inserted at its new location and deletion from the computer display screen of the distinctive border and of the data transfer symbol. Additionally, the originally marked data is deleted from the computer screen display if the Cut function was chosen, while, if the Copy function was chosen, the originally marked data is unmarked and left unaltered at the conculsion of the data transfer operation.

7 Claims, 5 Drawing Sheets

VISUALLY ASSISTED METHOD FOR TRANSFER OF DATA WITHIN AN APPLICATION OR FROM A SOURCE APPLICATION TO A RECEIVING APPLICATION

This application is a continuation application of Ser. No. 108,619, filed Oct. 15, 1987, and now abandoned.

BACKGROUND OF THE INVENTION

1. Field of the Invention

The subject invention generally relates to transferring data within and between active computer applications and, more particularly, visually assisting operators in making such transfers between simultaneously active applications.

2. Description of the Prior Art

The need to transfer information between different computer application programs and between files within the same program has grown in importance along with the development of the capability to simultaneously display and access multiple files and application programs on a single computer screen through the use of windows or viewports. Each application displayed within a window can be initiated, accessed, changed, saved, closed and exited independently of events occurring within other concurrently displayed windows. The operator may thereby view and manipulate data within and between multiple sources without the inconvenience and loss of time involved in closing and exiting one application in order to access another.

An additional benefit of multiple, simultaneously active application programs is the possibility of obtaining data stored or calculated by one application program and transferring it directly to another. For example, one window can calculate and display the results of a spreadsheet calculation which is needed in a simultaneously displayed full screen editing program. The desired transfer of information can be accomplished through a "cut and paste" operation which involves either deleting or copying the data from one application (both of which functions may be referred to as "cutting") and writing that data (sometimes referred to as a "pasting" function) into another application.

Certain text editors perform this operation on a basic level by allowing the operator to write a specified number of lines into a temporary system buffer or another file using a GET function and then to later retrieve those lines during the same or later session with the text editor by using a PUT function. However, such editors are relatively primitive since they do not show the operator the contents of the temporary buffer/file, thus failing to provide a full screen interface to the operator who has no readily accessible visual concept of what is occurring during the cut and paste operation. Moreover, this type of text editor is generally designed only to transfer data between files within the same program rather than between different programs. A more detailed explanation of the functioning of such text editors is provided in "VM/SP System Product Editor Operator's Guide," International Business Machines Corp., Manual No. SC24-5221-2.

Certain applications do support cut and paste operations between serially executing programs as well as within applications. A transient data storage buffer area, known as a "clipboard", is used to temporarily store manually marked data from one window of the display screen until it is pasted into a location in another window specified by positioning of the screen cursor at a point within the latter window. Details of such an application are discussed in two books entitled "Microsoft Windows Operators Guide" and "Microsoft Windows Operating Environment" which are both available from Microsoft Corporation, Bellevue, Wash.

Although the "clipboard" type of cut and paste operation accomplishes the end goal of transferring information between concurrently active applications, it does so without providing a consistent operator/screen interface and in a manner which is not particularly operator-friendly. For example, once data has been marked and stored on the "clipboard", the window screen display, in a case involving copying rather than deletion, remains visually unchanged from its appearance prior to the "cut" without providing the operator any spatial references while he seeks to reposition the data at its destination location unless he refers back to the data source location. In a case where source data is meant to be deleted, that deletion occurs prior to reinsertion at the data destination location, thereby exacerbating the operator's problems since he loses totally the ability even to refresh his memory due to the complete disappearance of the source data from the computer display screen once a "cut" has been initiated. Thus, he must rely on imagination to picture important parameters of deleted information such as its width, size and centering, making appropriate placement of the data to be pasted much more difficult, time-consuming and inconvenient. In certain programs, when a deletion occurs, this problem is further compounded by automatic reformatting of the text remaining on the computer display screen at the data source location. Finally, regardless of whether a delete or copy type of cut and paste operation is undertaken, the operator is generally offered no visual assistance from the screen to indicate either that such an operation is in progress or how far it has progressed. The absence of a friendly and informative operator interface diminishes the value of existing methods of cutting and pasting data both within and between applications.

SUMMARY OF THE INVENTION

It is therefore an object of the subject invention to provide a visually informative and friendly interface to an operator while that operator is transferring data either within a computer program or between simultaneously active computer programs.

According to the invention, an application is provided which allows the operator to view and manipulate data continuously during the process of transferring that data within or between files within a program or between different programs which are simultaneously active and concurrently viewable in different windows or areas of a computer display screen. An operator desiring to transfer data is enabled to mark all or part of the data appearing in one window. A transfer operation is initiated by operator selection from a pulldown menu accessible in each active computer display window between two types of transfer subfunctions, referred to as "cut" and "copy". Choice of the "cut" function causes eventual destruction and deletion of the marked data after completion of the transfer operation, while choice of the "copy" function leaves the originally marked data intact after conclusion of the data transfer. Marked data is left unaltered during any data transfer operation. When either type of transfer function is initiated, a visually distinctive border is caused to appear on the computer display screen around the marked data which provides a spatially accurate block outline thereof. Subsequent selection of the marked data area causes a distinctive data transfer symbol to appear within the bordered area. The appearance of both the border and the data transfer symbol on the computer display screen provides a continuous visual reminder to the operator that a data transfer operation is in progress. The data transfer block may be moved to any other location on the computer display screen either within the same window or in any other window. Since the data transfer block is an accurate spatial representation of the data to be transferred and since the originally marked data remains visibly unaltered during the transfer operation, the operator may more easily position the data properly in its new desired data destination location, as well as refresh his memory as to the contents of the data transfer block during data transfer. After the marked data block is properly positioned in its new location, the operator completes the data transfer operation by accessing a pulldown menu located in the data destination computer display window in order to select a "paste" function from that menu. This selection has several effects. It causes the originally marked data to appear on the computer display screen at the new location, results in the disappearance of both the border and the data transfer symbol from the computer display screen, and, if called for by previous selection of the "cut" function, deletes the marked data from the data source location. It is to be assumed that all operator commands, selections and options may be implemented through one or a combination of input devices such as a keyboard, mouse or similar device.

BRIEF DESCRIPTION OF THE DRAWINGS

The foregoing and other objects, aspects and advantages of the invention will be better understood from the following detailed description of the invention with reference to the drawings, in which.

DETAILED DESCRIPTION OF THE PREFERRED EMBODIMENT OF THE INVENTION

Figure 1:
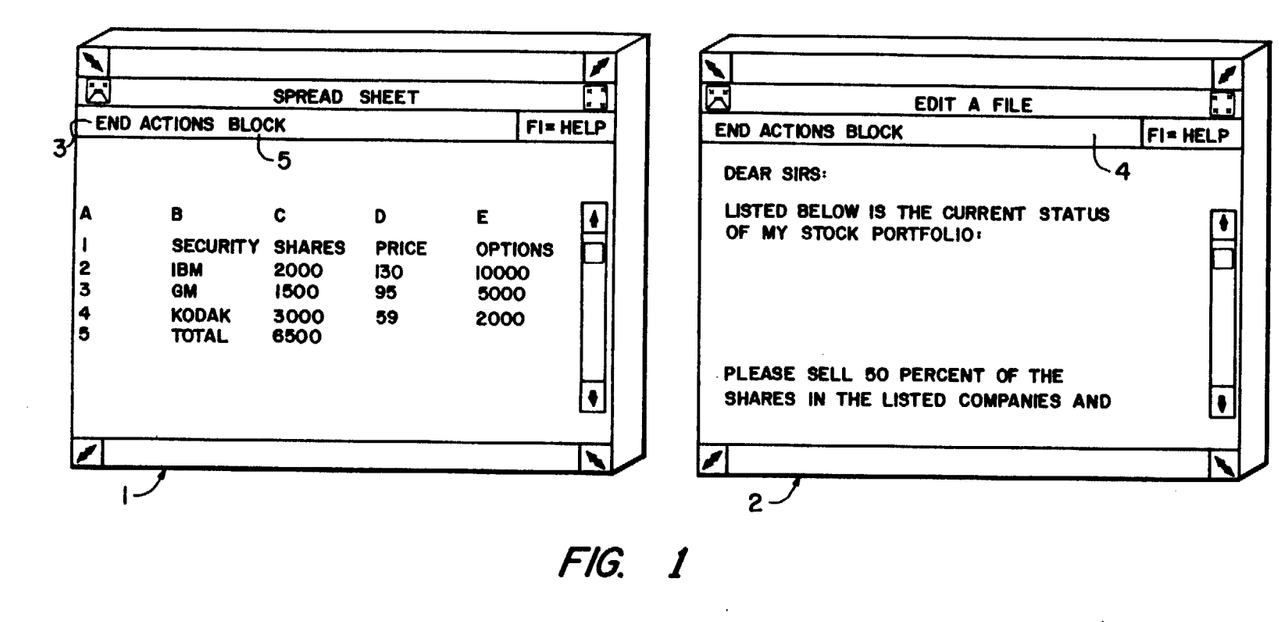
FIG. 1 illustrates two windows containing data which are simultaneously visible on a computer display screen.

For a more detailed understanding of the invention reference is first made to FIG. 1 of the drawings. In this figure, there are illustrated two simultaneously viewable windows from a computer display screen containing data from two independent simultaneously active computer application programs. Window 1 shows data in table form resulting from calculations performed by a spreadsheet computer program. Window 2 shows a portion of a file produced by a text editing program. An operator may perform various functions within each window by accessing application action bar 3 or 4 within either window and selecting a particular function and/or related subfunction from the respective application action bar. Functions and related subfunctions available on application action bars 3 and 4 are considered identical for purposes of this illustration of the invention.

Figure 2:
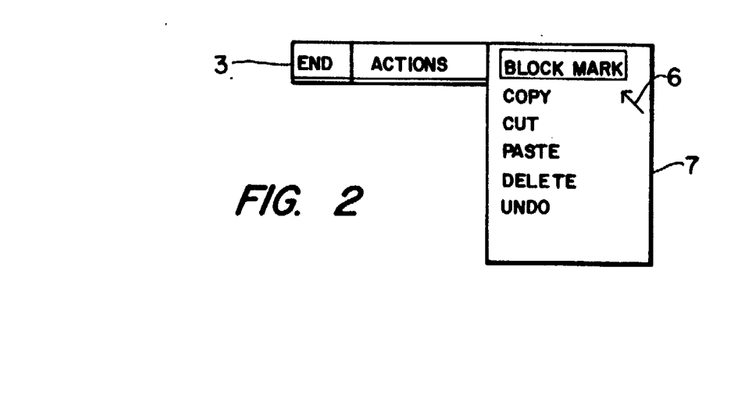
FIG. 2 is a detailed view of an application action bar after selection of the Block function from within one of the windows shown in FIG. 1.

Referring to FIG. 2, the various subfunctions which may be performed after selection of Block function 5 from application action bar 3 are shown. Function selection may be accomplished by positioning cursor 6 over the desired function within application action bar 3 and activating the function. The particular characteristics of cursor 6 are unimportant as far as the invention is concerned. That is, the cursor could be a standard textual type cursor, a pointing cursor located adjacent the next available character box, and so forth. Cursor 6 may be positioned by means of an input device such as a mouse, keyboard, joystick or similar device. The same input device may also be used to activate the desired function. The particular characteristics of the input device and exact manner of activating the desired function are also unimportant as far as the invention is concerned.

Cursor 6 as shown in FIG. 2, denotes operator selection of Block function 5 in application action bar 3. By selecting a function from application action bar 3, the operator enables a pulldown menu 7 which can become visible in a number of ways, such as by moving cursor 6 downwardly below the selected function or by activating a key while cursor 6 is positioned over Block function 5. Pulldown menu 7 presents a list of subfunctions available to the operator, any single one of which may be selected by repositioning cursor 6 over or adjacent the desired subfunction and activating the subfunction. Again, the details of repositioning of cursor 6 and the selection of a subfunction are not material to the invention. As shown in FIG. 2, these subfunctions may include Block Mark, Copy, Cut, Paste, Delete or Undo, although other subfunctions may also be available.

Figure 3:
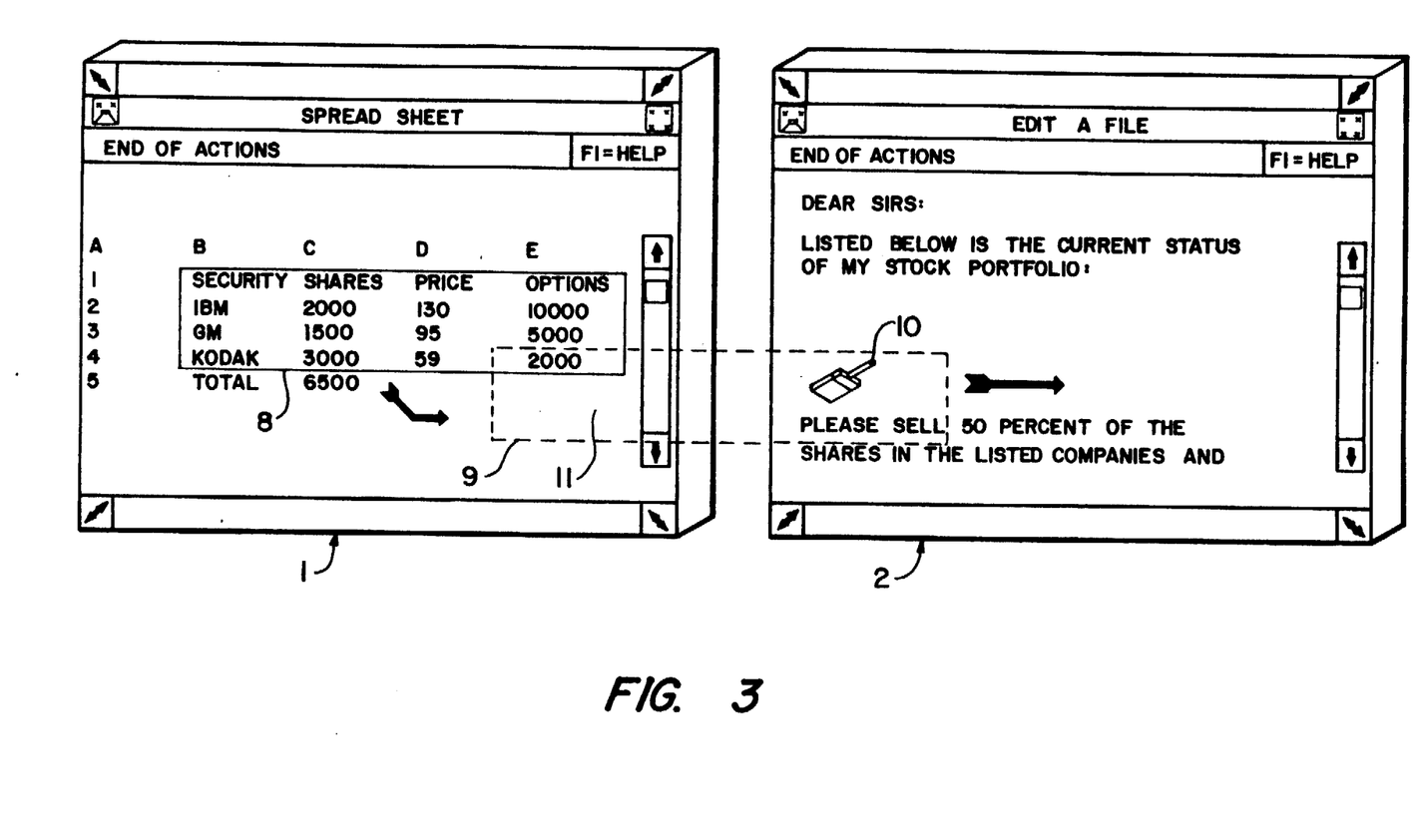
FIG. 3 is a representation of the two windows of FIG. 1 during an intermediate phase of a transfer of data between the two windows.

For purposes of illustrating this invention, it is assumed that the operator desires to transfer data from a data source location in window 1 to a data destination location in window 2. Referring now to FIG. 3, the appearance of a computer display screen having two active windows is shown during an intermediate phase of a data transfer between the two windows. To initiate a data transfer operation, the operator, while operating in active window 1, selects Block function 5 as described above from application action bar 3 and then further selects the subfunction Block Mark. Cursor 6 is then repositioned and moved so as to mark the data which the operator desires to transfer. Marking can be accomplished in a variety of ways, such as by moving cursor 6 adjacent to or over individual or groups of characters or lines while activating the input device. Marked data is delineated in an operator-viewable fashion, such as by shading or highlighting all marked characters. The exact details of the marking procedure are not relevant to this invention. Shaded area 8 in FIG. 3 shows one possible appearance of marked data and, for purposes of illustration of the invention, represents a data source location.

After marking data, the operator reaccesses Block function 5 in order either to unmark the data and exit the data transfer operation by selecting the Undo subfunction from pulldown menu 7 or to proceed with the data transfer operation by selecting the Cut or the Copy subfunction to determine the type of data transfer operation desired. The ability to terminate the data transfer operation at any point therein is always available to the operator through access to the appropriate application action bar.

It is at this point that the novel aspects of this invention first become apparent. After either the Cut or Copy subfunction is selected, border 9 is added to the screen display within window 1 to outline shaded area 8. Border 9 can appear in a number of different ways, such as dotted, dashed or solid single or multiple lines. What is important is that border 9 be distinctive enough to immediately and continuously alert the operator in a visual manner that a data transfer operation has commenced.

The actual transfer of data is by means of a "drag" operation and begins by repositioning cursor 6 on or within border 9 and selecting it by means, for example, of an input device. Upon selection, cursor 6 may be temporarily transformed into a data transfer symbol 10, such as the paintbrush shown in FIG. 3, appearing within border 9 for the duration of the data transfer process. Simultaneously, border 9 and data transfer symbol 10 may be merged to form data transfer block 11 which may be moved in response to commands from an input device to any data destination location within either window 1 or window 2 and which provides the operator with an accurate relica of the spatial characteristics of data from the data source location to assist him in repositioning the data to be transferred at the data destination location. Note, however, that data transfer block 11 may also be formed without requiring the concurrent appearance of data transfer symbol 10 within it. The physical appearance of data transfer block 11 may also vary in another way. It may appear on the computer display screen as either a transparent outlined area of the same size as shaded area 8 outlined by border 9 and containing only data transfer symbol 10 or as a replica of shaded area 8 appearing within border 9 over which data transfer symbol 10 is superimposed. FIG. 3, therefore, shows an intermediate position of the transparent area type of data transfer block 11 as it is dragged across window borders by the cursor or data transfer symbol 10 during the transfer of data from a data source location in window 1 to a data destination location in window 2.

Figure 4:
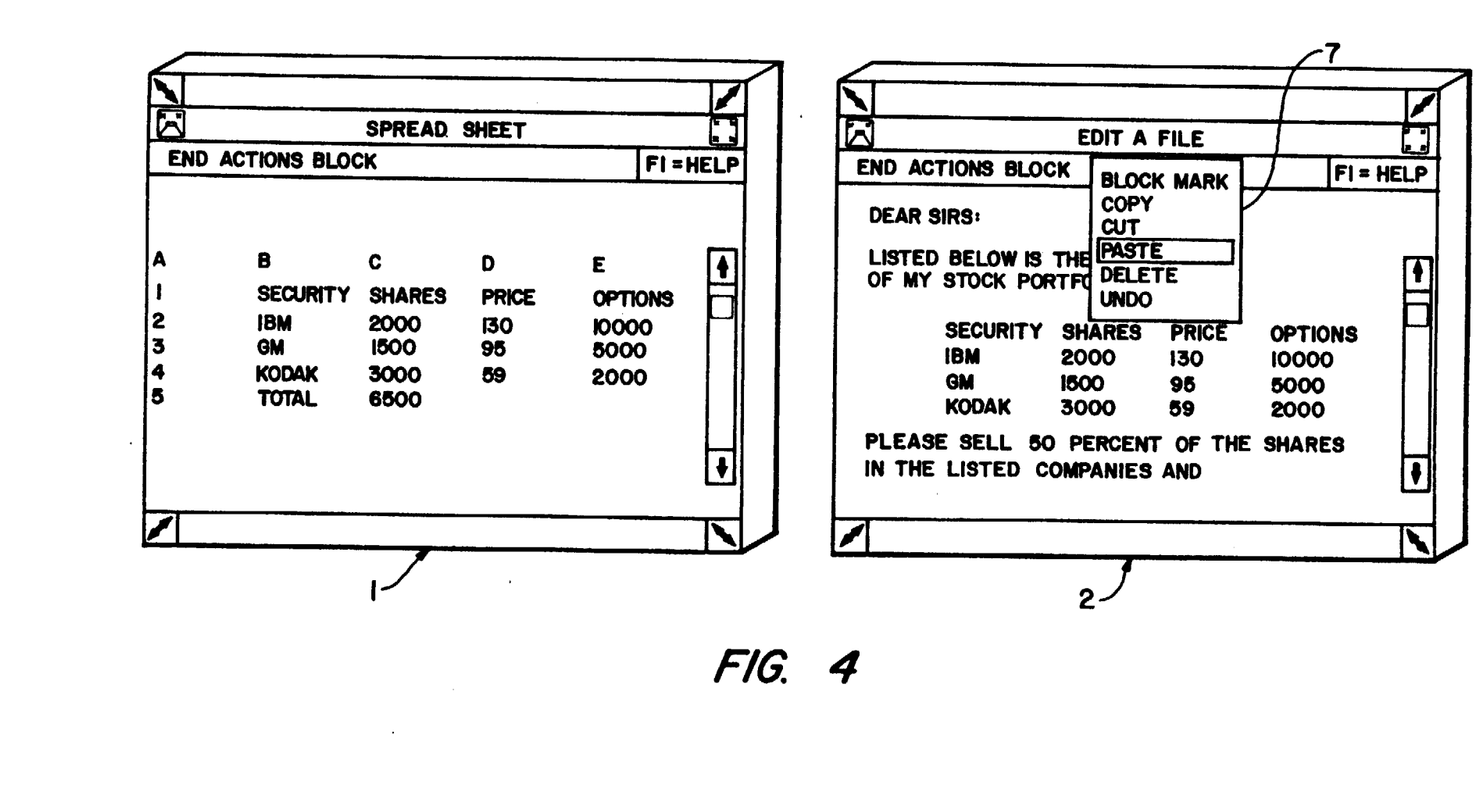
FIG. 4 is a representation of the two windows of FIG. 3 after completion of the transfer of data between those two windows.

When data transfer block 11 has been correctly positioned, in this case in window 2, the operator selects the Block function from application action bar 4 in window 2 and then further selects the Paste subfunction from pulldown menu 7. At this point, if the Copy subfunction was selected at the initiation of the data transfer operation, the marked data within shaded area 8 from the data source location in window 1 is permanently copied into the data destination location designated by the position of data transfer block 11. Thereafter, in window 1, the shaded area 8 is unmarked, and, in window 2, both border 9 and data transfer symbol 10 are caused to disappear entirely from the computer display screen, while data transfer block 11 ceases to exist. FIG. 4 shows a computer display screen after completion of a data transfer operation in which a Copy subfunction was selected and before disappearance of pulldown menu 7 from window 2 after the Paste subfunction was selected. On the other hand, if the Cut subfunction was originally selected, the same events transpire as with the Copy subfunction, and, in addition, the data within shaded area 8 in window 1 is entirely deleted from the screen after it has been inserted into window 2. It is important to note that, regardless of whether the Cut or the Copy subfunction was originally selected, the data within shaded area 8 at the data source location in window 1 remains continuously visible to the operator throughout the data transfer operation.

Figure 5A:
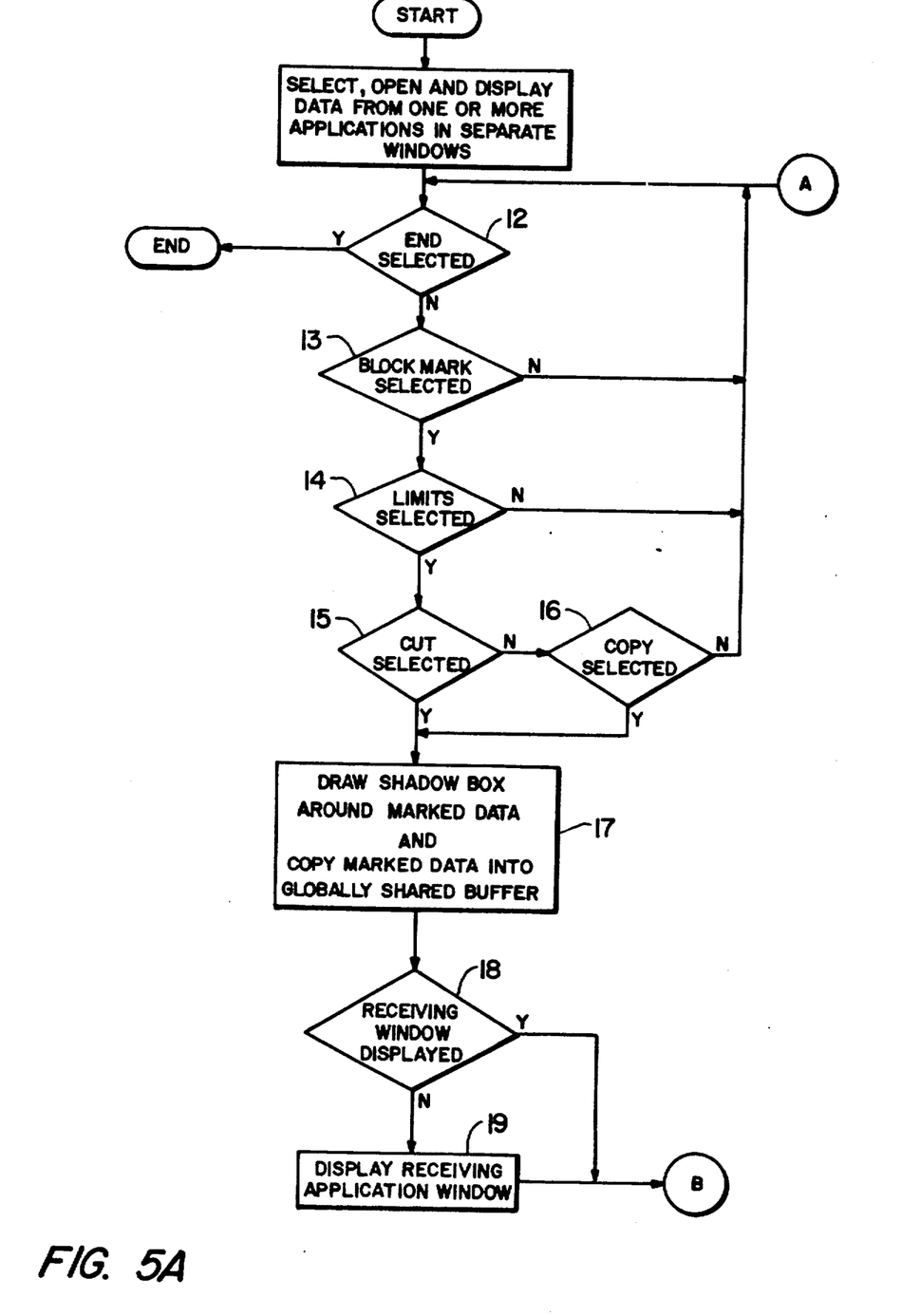
FIGS. 5A and 5B, taken together, are a flow diagram showing the operation of the invention.
Figure 5B:
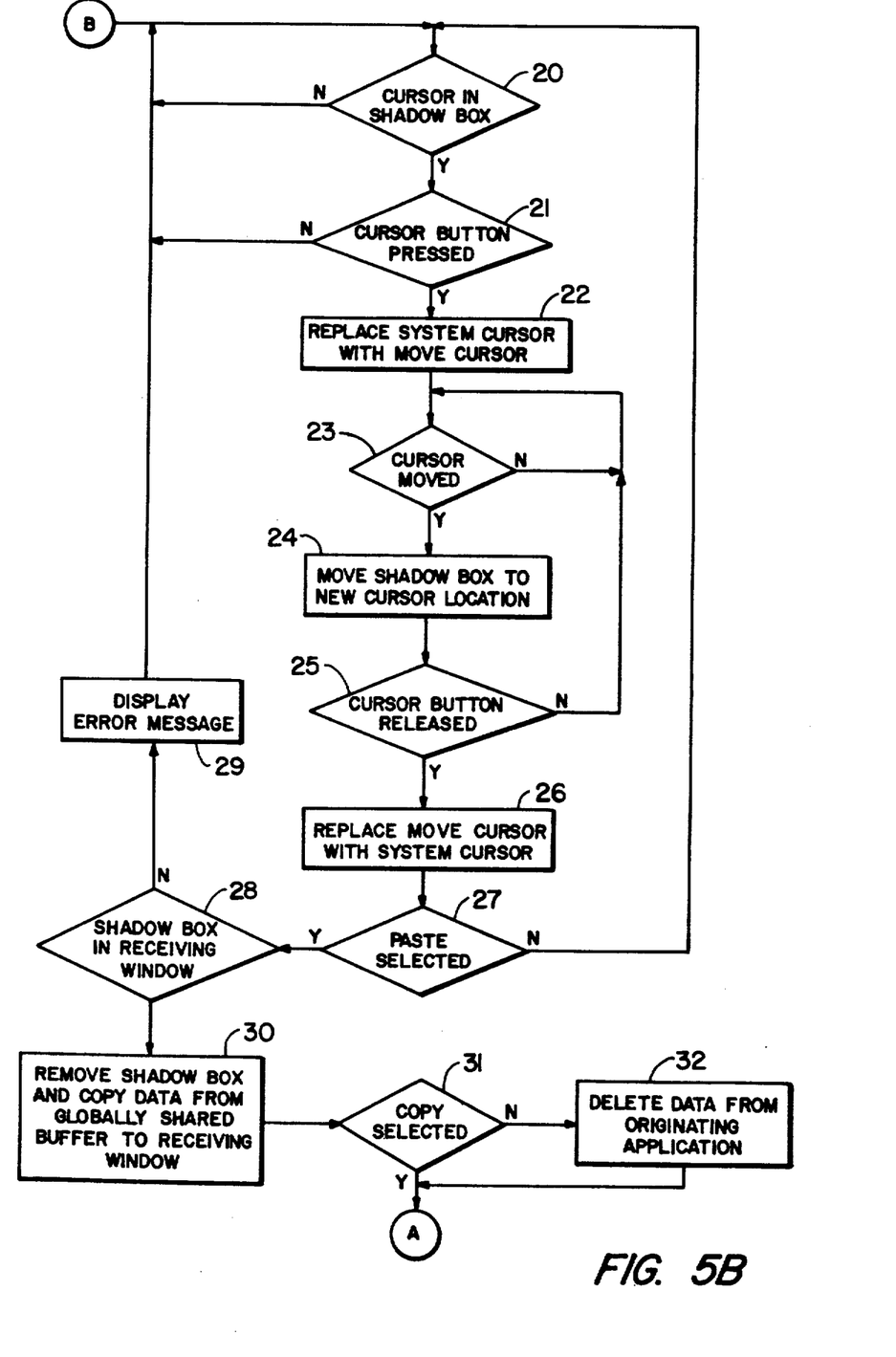

The flow diagram in FIGS. 5A and 5B shows the operation of the invention. In the flow diagram, the graphical conventions of a diamond for a test or decision and a rectangle for a process or function are observed. In addition, circles with alpha characters represent connectors showing the manner in which the flow of the logic of the program progresses from one figure to the other and back again. These conventions are well understood by programmers skilled in the art, and the flow diagram is sufficient to enable a programmer of ordinary skill to write code in any suitable computer programming language such as BASIC, Pascal or C for a computer, such as the IBM Personal Series/2 (PS/2) family of computers which supports those languages.

In order to start a data transfer operation between two different application programs, the operator activates each of the application programs in separate windows viewable on a computer display screen and causes to be displayed in one window the specific area of the source or originating application program which contains the data it is desired to transfer while causing to be displayed in the second window the specific area of the destination or receiving application program into which the data is to be transferred. The actions required are not detailed here as they have no relevance to this invention. Those skilled in the art will understand that the data can be numeric or alphanumeric and can be derived from a variety of sources, such as an existing spreadsheet, data base or text editing file. Similarly, the data destination can also be a spreadsheet, data base or text editing file.

Next, the system monitors the user input to determine what action is requested. In the preferred embodiment, the user input is by means of a mouse-driven system cursor which can moved along a command bar at the top of the screen to select one of several displayed commands by first causing the desired command to be highlighted and then pressing the select button on the mouse. In a typical system, there are a plurality of commands from which a user may select, but for purposes of this disclosure, only those which directly relate to the operation of the invention will be described. Those skilled in the art will understand that this discription is merely illustrative and that many other commands would be displayed in a practical implementation. Also, not shown in the flow diagram is the logic related to the movement of the cursor in response to movements of the mouse by the user and selection of commands from a menu or command bar, since this logic is well known to those skilled in the art.

The first command tested for selection is the END command in decision block 12. Of course, if this command is selected the process ends, but on the other hand if the BLOCK MARK command is selected in decision block 13, a test is made in decision block 14 to determine if the user has marked the limits of the block. Typically, when the BLOCK MARK command is selected, the user is prompted to move the cursor to the beginning of the block and press the select button, and when that is accomplished, the user is then prompted to move the cursor to the end of the block and press the select button. When this is done, the limits of the block have been specified, and the process of marking the block is complete. A refinement to this process is once the marking process is complete, highlighting the marked block and giving the user the option to accept the marked block, thereby verifying the selection.

Tests are then made in decision blocks 15 and 16 to determine if either a CUT or a COPY command has been selected. If so, a shadow box is drawn around the marked data in function block 17, and the marked data is copied into a globally shared buffer from which the destination or receiving application program can access the data. At this point, a test is made in decision block 18 to determine if the desired receiving window is displayed on the screen. If it is, control passes directly to the top of FIG. 5B; otherwise, the receiving application window is displayed in function block 19 before control passes.

Referring now to FIG. 5B, the user input is monitored in the next two decision blocks. First, a test is made in decision block 20 to determine if the system cursor is in the shadow box. If the cursor is in the shadow box, a test is made in decision block 21 to determine if the select button on the mouse has been pressed, indicating that the user has selected the shadow box. If so, the system cursor is replaced with a move cursor in function block 22, in effect joining the cursor with the shadow box. The cursor is monitored in decision block 23 to determine if the user has moved it. If so, the shadow box is moved to the new cursor location in function block 24. To the user, the movements appear to be simultaneous since the computations involved are easily and quickley made. The movement of the shadow box with the cursor continues until the select button on the mouse is released by the user. This is detected in decision block 25. When the select button is released, the move cursor is replaced by the system cursor in function block 26 allowing the user to move the cursor without moving the shadow box. This the user may do at any time, but typically the user would do this when the shadow box has been positioned in the destination or receiving application window at the desired location. By replacing the move cursor with the system cursor, the system is conditioned to accept a user command input.

Again, there are many commands the user could select from the command bar, but for the cut or copy operations initiated by the user, the command of interest is the PASTE command. The test made in decision block 27 detects the selection of the PASTE command, and it is assumed that for purposes of this disclosure that if the PASTE command is not selected, the user is not satisfied with the placement of the shadow box and desires to reposition it. Therefore, the alternative allowed to the user if the PASTE command is not selected is to return control to decision block 20. However, if the PASTE command is selected, a test is made in decision block 28 to determine if the shadow box is completely within the destination or receiving window. If it is not, the data within the shadow box is not properly positioned for copying into the receiving program. In that case, an error message is displayed in function block 29, and control returns to decision block 20 to permit the user to complete the positioning of the shadow box.

Assuming that the test in decision block 28 is positive, that is the shadow box is completely within the receiving window, the shadow box is removed from around the imported data displayed on the screen and, in the internal data structure, the data in the globally shared buffer is copied to the destination or receiving application program in function block 30. If copy was selected at the beginning of the operation in function block 16, this will be remembered in decision block 31, and control will return directly to decision block 12 in FIG. 5A. On the other hand, if cut was selected in decision block 15, the test in decision block 31 will be negative, and the data in the marked block of the source or originating application will be deleted in function block 32 before control returns to decision block 12 in FIG. 5A.

While the invention has been particularly shown and described with respect to a preferred embodiment thereof, it will be understood by those skilled in the art that changes can be made in form and detail without departing from the scope and spirit of the invention.

Having thus described our invention, what we claim as new, and desire to secure by Letters Patent is:

1. A method of visually assisting a user in transferring data from one window to another on a computer display screen comprising the steps of:

displaying different, concurrently running programs in first and second active windows on said computer display screen;

dynamically and graphically marking a block of data from said first window which is to be transferred, whereby the graphically marked data block has a displayed outline representing the spatial characteristic of the data block;

selecting between either a cut or a copy type of data transfer operation;

selecting with a cursor the graphically marked data block to form a data transfer block representing the data to be transferred;

dragging with said cursor on said screen said data transfer block having the displayed outline representing the spatial characteristics of the data block from said first window, across boundaries of said first and second windows, and positioning said data transfer block within said second window without altering data in said first window, said dragging operation being performed while continuously displaying said data transfer block;

inserting said marked data into said second window where said data transfer block has been positioned; and deleting said marked data from said first window after insertion of said marked data at said second window if a cut type of data transfer operation has been chosen.

2. The method of transferring data recited in claim 1 further comprising the steps of:

displaying a data transfer symbol within said data transfer block after selection of said border to provide a visual indication that a data transfer operation is in progress; and deleting said data transfer symbol from the computer display screen after insertion of said marked data into said second window.

3. The method of transferring data recited in claim 1 wherein the step of graphically marking data is performed by displaying a border around said marked data in said first window and wherein said border is displayed as said data transfer block as it is moved by dragging.

4. The method of transferring data recited in claim 3 further comprising the step of deleting said border from said second window and unmarking said data in said first window when said marked data is inserted in said second window.

5. In a device controlled computer display system, a method of visually assisting a user in moving information between windows on a screen of a display device included in said system, said method comprising the steps of:
- displaying different, concurrently running programs in respective active windows;
- defining in one window said information to be moved;
- selecting between either a cut or copy type of move operation;
- copying said information to be moved;
- generating a graphical representation of said information upon selecting a move operation, said graphical representation showing the user at least the spatial characteristics of said information to be moved;
- dynamically selecting in said one window said graphical representation of said information to be moved;
- using a device included in said system to drag said graphical representation on said screen across borders of said one window and a second window;
- positioning said graphical representation in said second window using said device;
- simultaneously maintaining said information active in said one window while said information is selected and said graphical representation is moved and positioned by dragging;
- inserting said copied information at a location in said second window where said graphical representation is positioned; and
- deleting said marked information from said one window after insertion at said second window if a cut type operation is selected.

6. In a device controlled computer display system, a method of visually assisting a user in moving information form one active window to another active window on a screen of a display device included in said system, said method comprising the steps of:
- displaying different, concurrently running programs in said active windows;
- dynamically marking the information in said one window which is to be moved;
- selecting between either a cut or copy type of move operation;
- copying said information to be moved;
- displaying a border around said marked information, whereby the displayed border represents the spatial characteristic of the information to be moved;
- selecting said border to form a transfer block of the information to be moved;
- using a device included in said system to drag said border from said one window to another window;
- simultaneously maintaining said information active in said one window while said information is selected and said border is being moved by dragging from one window to another window;
- inserting said copied information at a location in said second window where said border is positioned; and
- deleting said marked information from said one window after insertion at said second window if a cut type operation is selected.

7. A method according to claim 6 further comprising the steps of:
- inserting said marked information in said another window; and
- deleting said border in said another window and unmarking information on said one window after said marked information is inserted in said another window.

* * * * *